United States Patent
Lee

[15] 3,685,286
[45] Aug. 22, 1972

[54] FLUID CONTROL VALVE

[72] Inventor: Alwyne Lee, 47 Bushby's Lane, Formby, England

[22] Filed: March 9, 1971

[21] Appl. No.: 122,479

[30] Foreign Application Priority Data

Oct. 20, 1970 Great Britain..........50,155/70

[52] U.S. Cl. ................60/53 R, 60/97 E, 180/6.48, 137/636.1
[51] Int. Cl. .........................................B62d 11/00
[58] Field of Search ......60/53 R, 97 E; 180/6.48, 6.3

[56] References Cited

UNITED STATES PATENTS 2,446,242  8/1948  Orshansky...............180/6.48
3,247,919  4/1966  Moon......................180/6.48

*Primary Examiner*—Edgar W. Geoghegan
*Attorney*—Holman & Stern

[57] ABSTRACT

A fluid control valve has a pair of spool closure members which are slidable in unison to control flow between associated pairs of ports in response to relative movement between a pair of control elements on the valve. The relative movement causes axial displacement of actuators which engage an abutment secured to the spools, the abutment being biased into contact with the actuators.

6 Claims, 6 Drawing Figures

FLUID CONTROL VALVE

BACKGROUND OF THE INVENTION

This invention relates to valves for controlling the flow of fluids and has as an object to provide such a valve in a convenient form.

SUMMARY OF THE INVENTION

A valve according to the invention includes a body having a pair of ports and a passage therebetween, a closure member movably mounted in the body, a pair of valve operating elements mounted on the body and capable of movement relative to one another, actuating means located with respect to one of the elements and engageable with a co-operating means on the other of the elements and biasing means urging the closure member towards the actuating means, the actuating means co-acting with the closure so that when the operating elements are in a predetermined position relative to each other, the closure member is in a first position relative to the ports, irrespective of the position of the operating elements relative to the body, but in all other positions of the operating elements relative to each other, the closure member is in a second position relative to the ports.

A preferred form of the valve has two pairs of ports, two passages respectively interconnecting the ports of the respective pairs and a pair of closure members respectively associated with the pairs of ports.

There may thus be provided a hydrostatic transmission system comprising a pair of pump and motor units each of which includes a means for controlling the output speeds of the respective motors, a passage interconnecting the high pressure ports of the units, a passage interconnecting the low pressure ports of the units and a valve of the preferred form in the interconnecting passage, the operating elements of the valve being coupled to the speed control means respectively, with the arrangement being such that the closure members remain open when the control means are moved in unison and are shut when a control means is moved so as to vary the output speed of one of the units with respect to the other.

A valve according to the invention will now be described by way of example and with reference to the accompanying drawings, in which:

DETAILED DESCRIPTION OF THE INVENTION

Figure 1:
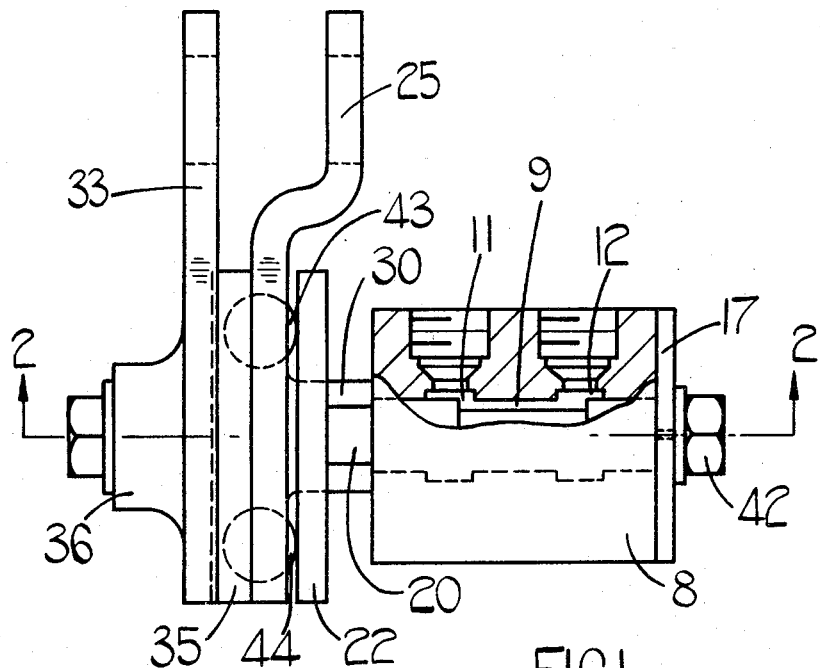
FIG. 1 is a part section of a valve.
Figure 2:
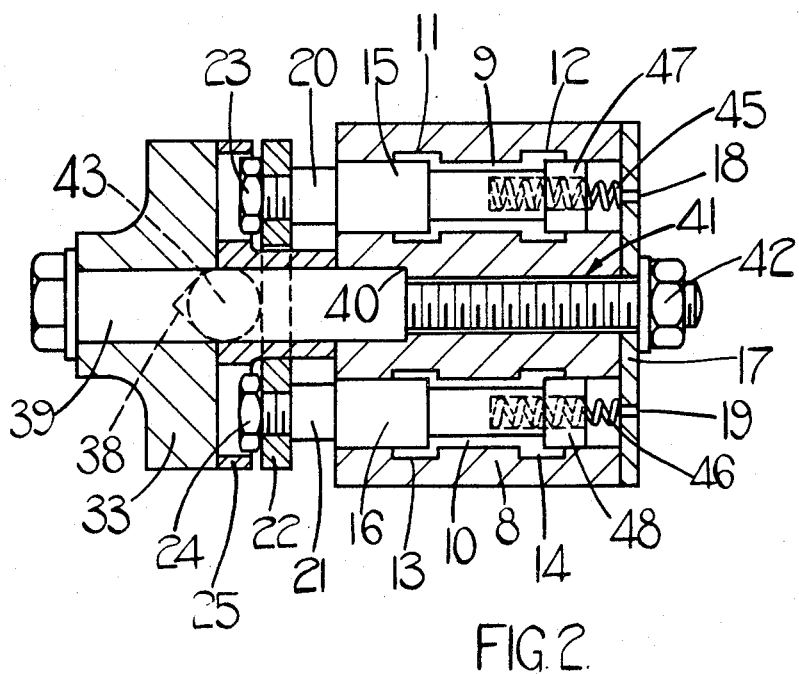
FIG. 2 is a section on line 2—2 in FIG. 1.
Figures 3, 4:
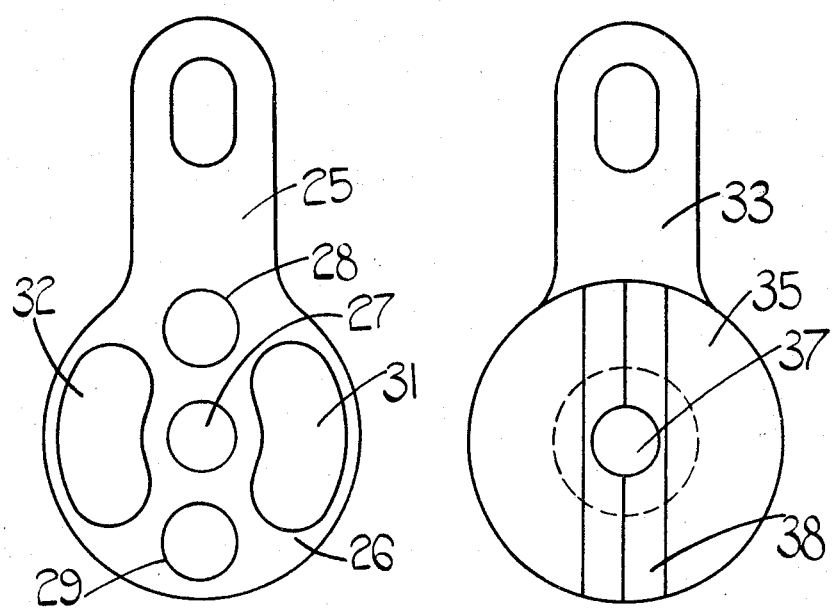
FIGS. 3 and 4 are details of parts of the valve shown in FIG. 1.

The valve comprises a body 8 in which there are two passages 9, 10. A pair of ports 11,12 opens into the passage 9 and another pair of ports 13, 14 similarly opens into the passage 10. Spool closure members 15, 16 are slidable in the respective passages 9, 10. A cover plate 17 has two drain holes 18, 19 respectively axially aligned with the passages 9, 10. Extending from the closure members 15, 16 are shouldered studs 20, 21 which support a plate 22. The plate 22 is secured by nuts 23, 24 respectively engaging the studs 20, 21.

A first valve operating element 25 in the form of a cranked lever has an enlarged portion 26 at one end thereof in which are three holes 27, 28, 29 with their centers aligned. A spigot 30, integral with the portion 26 and axially aligned with the hole 27 passes through a central hole in the plate 22 and engages the body 8. Also within the portion 26 are a pair of kidney-shaped cut-outs 31, 32 which form, in use, clearances for the nuts 23, 24.

A second valve operating element 33, also in the form of a lever has an enlarged portion 34 at one end which is formed on one side with a circular boss 35 and on the other side with a boss 36 of smaller diameter. A hole 37 passes centrally through both bosses and is axially aligned with the hole 27 in the element 25. A V-shaped groove 38 extends diametrically across the face of the boss 35. A bolt 39 passes through the holes 27, 37 and includes a shoulder 40 which seats in a counter-bored hole 41 in the body 8. A nut 42 secures together the body 8, elements 25, 33 and the cover plate 17 so that the elements 25, 33 are free to rotate about the shank of the bolt 39.

A pair of balls 43, 44, are located in the holes 28, 29 and engage the element 33. The balls 43,44 also abut a face of the plate 22. A pair of springs 45,46 are located in respective extensions 47,48 of the closure members 15,16 and engage the cover plate 17. The plate 22 is thus urged into contact with the balls 43, 44.

In use, when the holes 28, 29 are aligned with the groove 38, the balls 43, 44 enter the groove 38. The closure members 15, 16 are thereby moved by the springs 45, 46 to a position so that fluid may flow between ports 11 and 12 via passage 9, and between ports 13 and 14 via passage 10. This condition will obtain for all positions of the elements 25, 33 so long as the holes 28, 29 and the groove 38 remain aligned. In all other relative positions of the elements 25, 33, the balls are urged out of the groove 38 and thus actuate the closure members 15,16 against the springs 45, 46 to close the ports 11, 13.

Figures 5, 6:
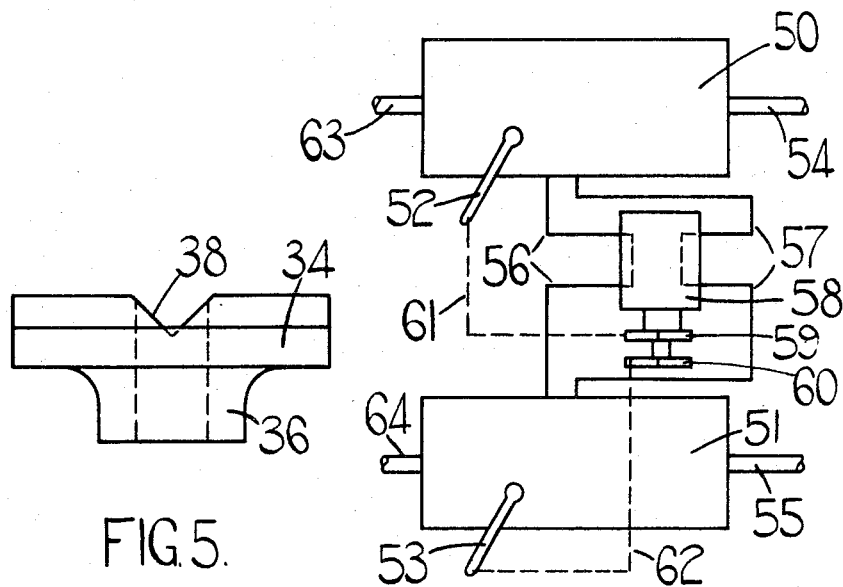
FIG. 5 is an end view of FIG. 4.
FIG. 6 shows diagrammatically a hydrostatic transmission system incorporating a valve as shown in FIGS. 1 and 2.

The hydrostatic transmission system shown diagrammatically in FIG. 6 comprises two pump and motor units 50,51 of a known type and each having a means in the form of a lever 52, 53 by which the output speeds at shafts 54, 55 may be controlled. The high pressure ports (not shown) of the units 50, 51 are interconnected by a passage 56. The low pressure ports are similarly interconnected by a passage 57. A valve 58 substantially as previously described is connected so as, in use, to open and close the passages 56, 57. Operating elements 59, 60 of the valve 58 are respectively coupled by linkages 61, 62 to the levers 52, 53. Input shafts 63, 64 of the units 50, 51 are driven by a single power means (not shown).

In use, the shafts 63, 64 rotate at identical speeds. When the positions of the levers 52, 53 are substantially identical, the operating elements 59, 60 are in positions relative to each other whereby the closure members (not shown) of the valve 58 permit flow through the passages 56, 57. The high and low pressure ports of the unit are thus interconnected to ensure that the speeds of the shafts 54, 55 are substantially identical. This condition continues to obtain so long as the position of the lever 52 corresponds to that of the lever 53.

If one of the levers 52, 53 is moved relative to the other, the valve 58 is operated by the linkages 61, 62 to isolate the high and low pressure ports of the units 50, 51 as previously described, to permit the speeds of the shafts 54, 55 to be varied.

A system of the kind described has a particular application to the transmission of tracked vehicles, in which steering of the vehicle is effected by varying the relative speeds of the tracks.

Having thus described my invention what I claim as new and desire to secure by Letters Patent is:

1. A hydrostatic transmission system which comprises in combination:
   a pair of pump and motor units having high pressure ports and lower pressure ports;
   a pair of speed control means for controlling the output speeds of the respective units;
   a first passage interconnecting the high pressure ports of the units;
   a second passage interconnecting the low pressure ports of the units; and
   a valve in said interconnecting passages, said valve including:
   a. a body;
   b. two pairs of ports in the body;
   c. a pair of passages respectively connecting the ports of the respective pairs;
   d. a pair of closure members respectively associated with the pairs of ports;
   e. a pair of valve operating elements mounted on the body and capable of movement relative to one another;
   f. actuating means located with respect to one of said elements and engageable with a co-operating means on the other of the elements; and
   g. biasing means urging the closure members towards the actuating means;
   the valve operating elements being respectively coupled to the speed control means; and the actuating means co-acting with the closure members so that, when the speed control means are in a relative position in which the output speeds are substantially equal, the closure members are open, but in all other relative positions of the control means the closure members are shut.

2. The hydrostatic transmission system as claimed in claim 1 in which said operating elements are mounted for rotation about a common axis.

3. The hydrostatic transmission system as claimed in claim 1 in which the closure members are in the form of spools slidable in the associated passages.

4. The hydrostatic transmission system as claimed in claim 1 including a plate to which the closure members are secured, said plate being urged by the biasing means to abut the actuating means.

5. The hydrostatic transmission system as claimed in claim 4 in which the actuating means comprises a pair of balls.

6. The hydrostatic transmission system as claimed in claim 5 in which the co-operating means on said other element comprises a groove within which said balls lie when the operating elements are in said predetermined position relative to each other.

* * * * *